Aug. 4, 1964     K. LUTHER ETAL     3,143,015
SHEET FEEDING, PUNCHING AND DISK STACKING EQUIPMENT
FOR THE MANUFACTURE OF WHEEL DISKS OR THE LIKE
Filed Sept. 26, 1960     4 Sheets-Sheet 1
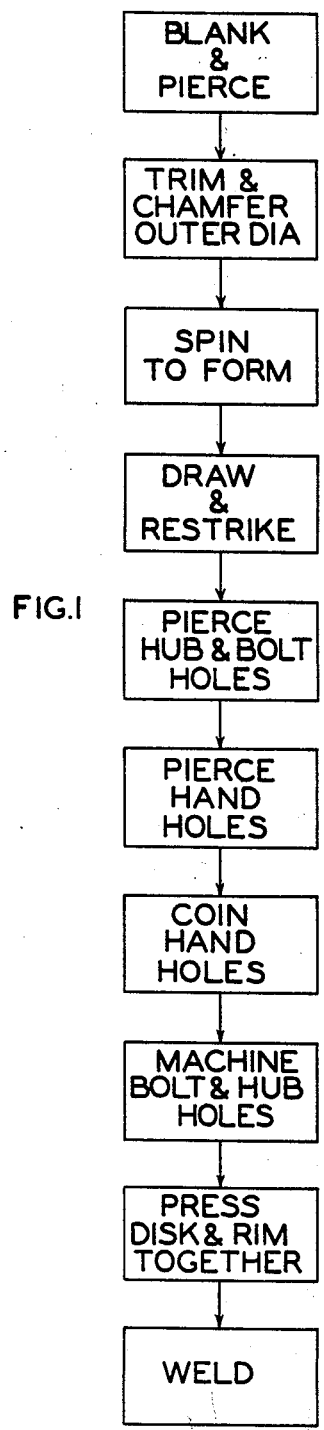
FIG.1
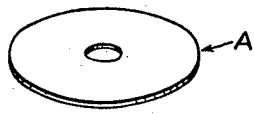
FIG.2
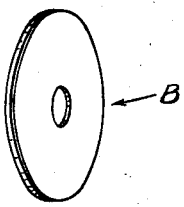
FIG.3
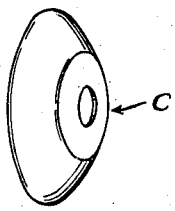
FIG.4
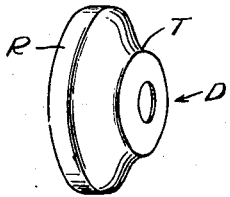
FIG.5
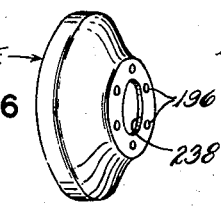
FIG.6
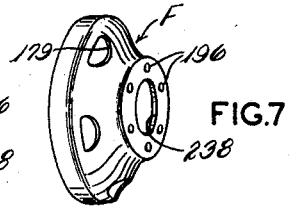
FIG.7
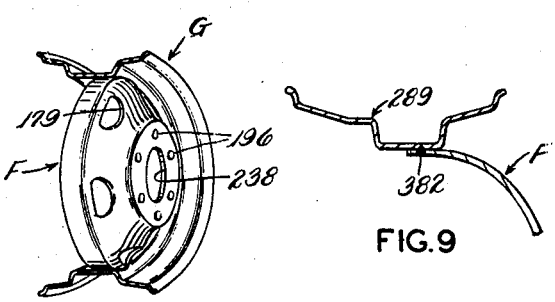
FIG.8
FIG.9

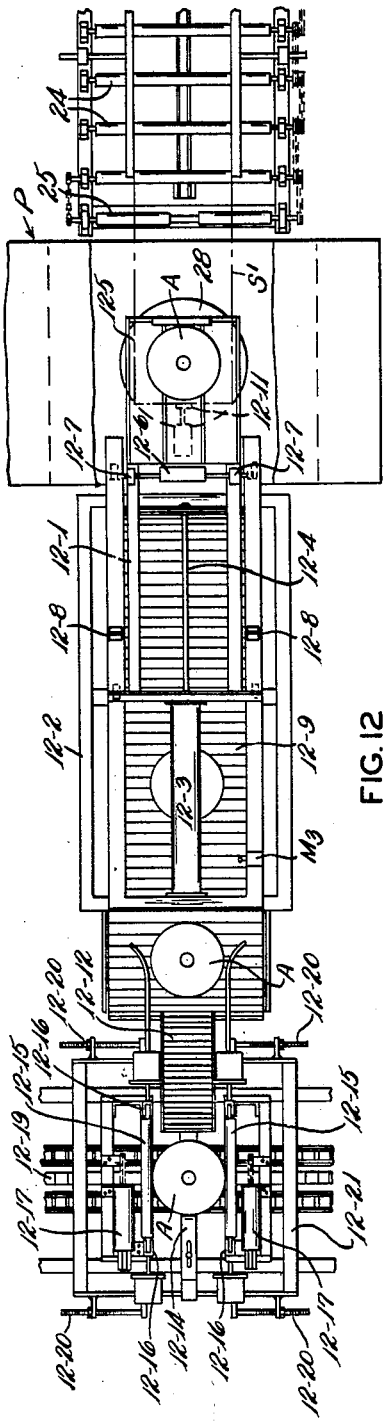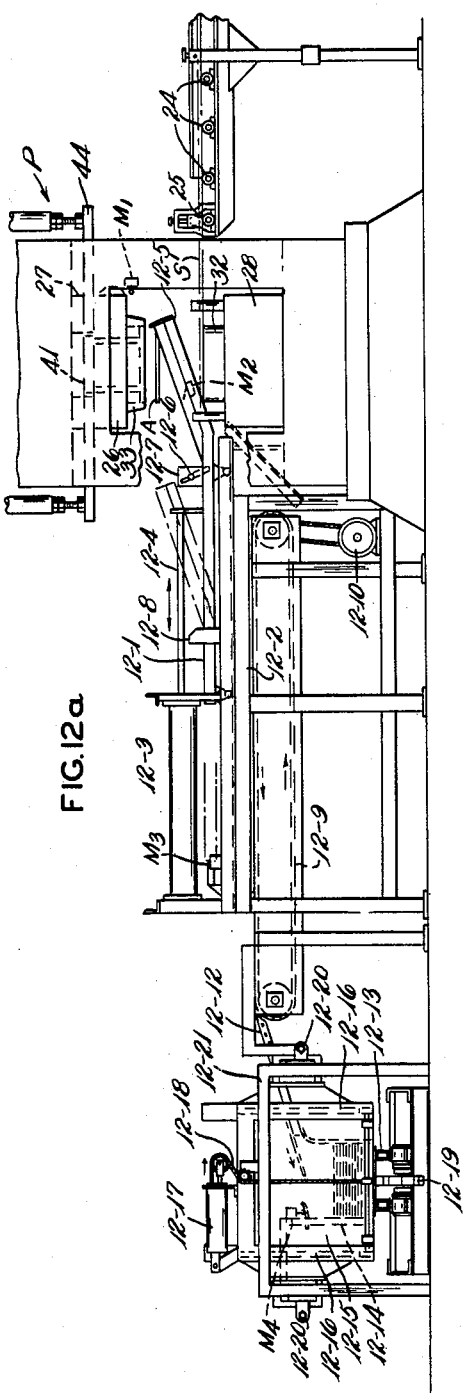

United States Patent Office 3,143,015
Patented Aug. 4, 1964

3,143,015
SHEET FEEDING, PUNCHING AND DISK STACKING EQUIPMENT FOR THE MANUFACTURE OF WHEEL DISKS OR THE LIKE
Karl Luther, Lathrup Village, and Gordon C. J. Parent, Southgate, Mich., and Walter W. Bulgrin, Akron, Ohio, assignors to The Firestone Tire & Rubber Company, Akron, Ohio, a corporation of Ohio
Filed Sept. 26, 1960, Ser. No. 58,582
7 Claims. (Cl. 83—91)

The invention relates to an improved continuous operation for producing disk wheels of conventional shape and cross section having optimum physical characteristics, and more particularly to a continuous wheel-making operation comprising a minimum number of steps.

Conventional wheel disks for automotive vehicles are generally bowl-shaped with a flat hub portion and a curved intermediate portion terminating in a cylindrical rim flange, and usually having an annular shoulder or nave therein. The cross sectional thickness tapers from the hub out to a relatively thin rim flange. The thin rim flange reduces weight at the periphery of the wheel while still providing adequate resiliency and impact strength. Hand holes are formed in the curved intermediate portion to provide spoke portions and further reduce weight and increase resiliency, and to provide access for inflating dual wheels.

Various methods have been practiced for producing such wheel disks, including a series of die-forming operations, a combination of extruding and die-forming operations, and a combination of hot or cold rolling a flat blank to taper it and then die-forming. In all of such methods of which we are aware, the metal is improperly stressed or inadequately worked to produce optimum physical characteristics in the final product.

The present invention contemplates making the wheel disk by cold spinning the curved bowl of tapering thickness from a flat blank without improperly stressing the metal, to obtain optimum physical characteristics requiring a minimum of die-forming to shape the disk into final form.

Certain prior attempts have been made to produce wheel disks by spinning, but in such cases the wheel was unduly stressed radially by the spinning operation itself or by forming operations before or after the spinning operation in order to produce the desired curved bowl shape of tapering thickness.

It is an object of the present invention to provide an improved method and apparatus for producing a wheel disk from a flat blank by spinning and die-forming operations which do not unduly stress the metal.

Another object is to provide an improved method and apparatus for continuously producing disk wheels in a minimum number of operations.

A further object is to produce an improved wheel disk of curved bowl shape with tapering thickness having optimum physical characteristics.

Other objects include the provision of improved blanking means, improved spinning means, improved die-forming and piercing means, improved disk and rim assembling means, and improved welding means, all cooperating to carry out the improved method of producing an improved wheel disk and rim and disk assembly.

These and ancillary objects are accomplished by the improved methods, apparatus and articles disclosed and claimed herein, preferred embodiments of which are shown by way of example in the accompanying drawings and described in detail herein. Various modifications and changes in details of construction are comprehended within the scope of the invention defined in the appended claims.

In carrying out the invention, a flat circular disk is blanked, edge-machined, and then spun on a mandrel in such manner as to form curved bowl shape of tapering thickness by progressively displacing elements of the metal axially on a curved mandrel while maintaining the outer diameter of the disk constant, then die-forming the bowl into finished shape without unduly stressing the intermediate curved portion thereof, piercing the hand holes and hub bolt holes in the formed disk, press fitting the formed disk into a rim, and finally circumferentially welding the rim to the disk.

In the drawings:

FIG. 1 is a block diagram showing the sequence of the principal operations in making disk wheels according to the present invention.

FIG. 2 is a perspective of the flat circular blank from which the bowl portion of the wheel is formed.

FIG. 3 is a perspective view representing the blank after machining its outer edge.

FIG. 4 is a perspective view of the spun bowl.

FIG. 5 is a perspective view of the bowl die-formed into finished shape.

FIG. 6 is a perspective view of the formed bowl after piercing bolt holes in the hub portion.

FIG. 7 is a perspective view of the formed bowl after piercing hand holes in the intermediate portion.

FIG. 8 is a perspective view showing the finished bowl pressed into a rim.

FIG. 9 is an enlarged fragmentary sectional view showing the bowl and rim welded together.

FIG. 12 is a schematic plan view of the mechanism for taking the blanks from the press and stacking them.

FIG. 12a is a side elevation thereof.

In making a disk wheel having the conventional shape with tapering thickness shown in perspective in FIGS. 5–7, the wheels are spun from the flat circular edge-machined disk B shown in FIG. 3 to the intermediate bowl shape C of FIG. 4, and then die-formed to the finished shape D of FIG. 5, followed by hole piercing, coining and machining operations.

Figure 10:
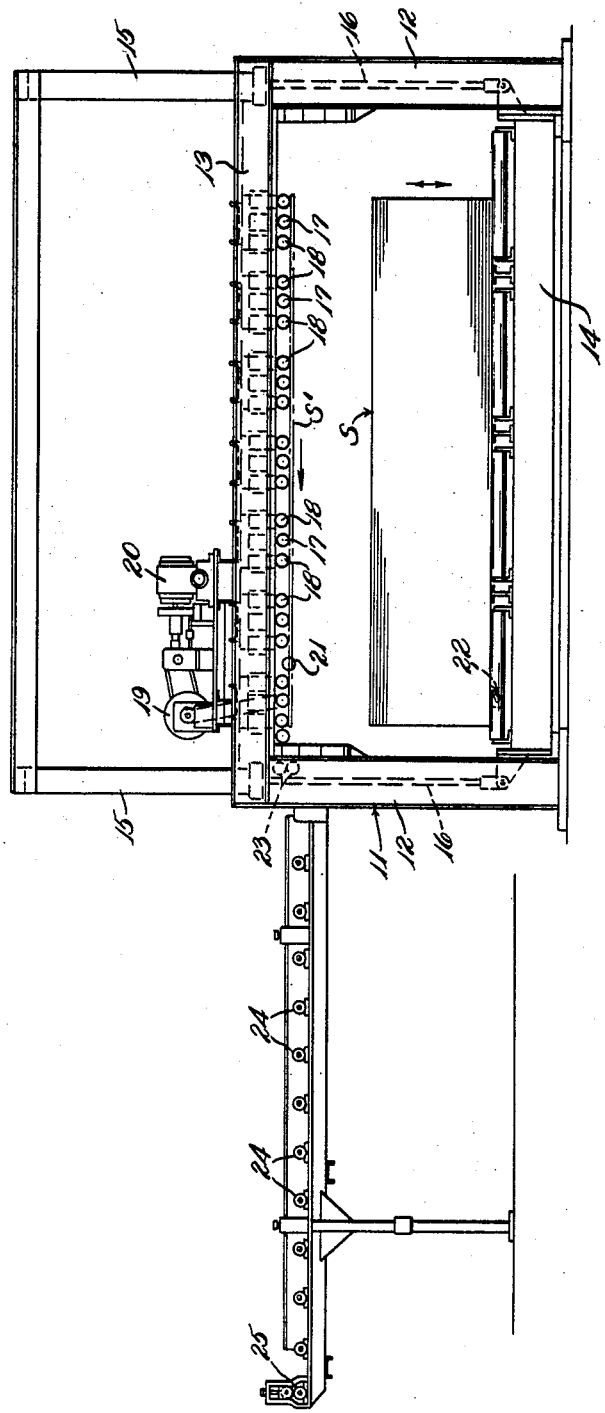
FIG. 10 is a schematic elevational view of the hydraulic stack lifter and roll feeder which automatically feeds plates one at a time to the blanking press.
Figure 11:
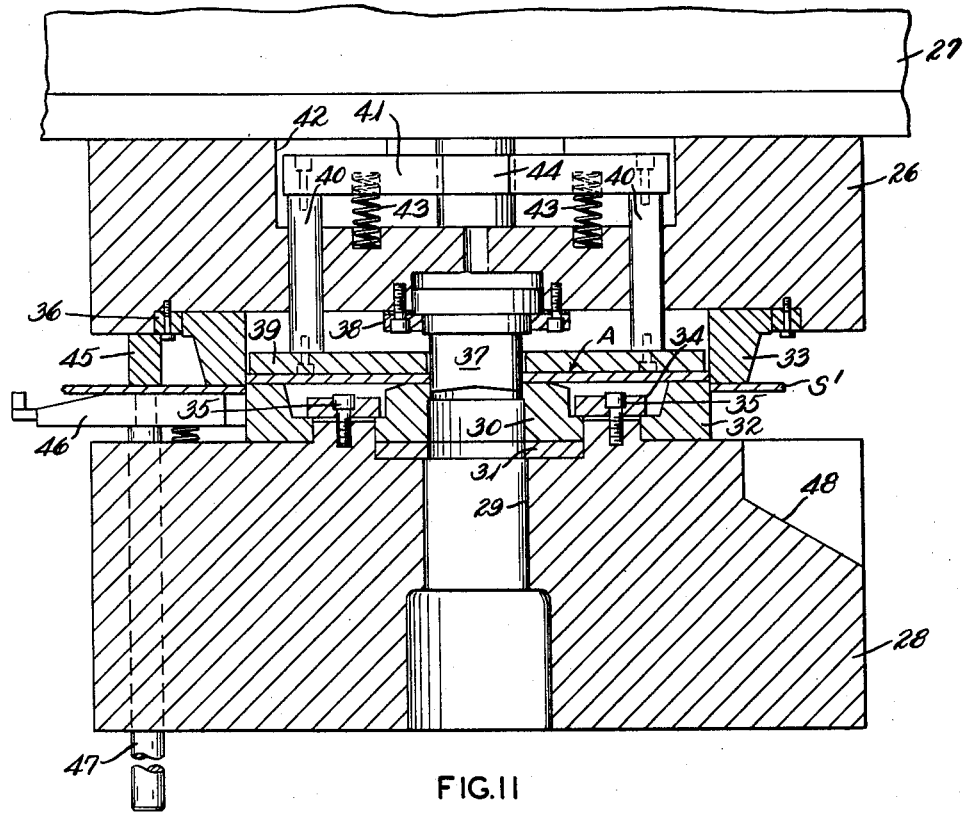
FIG. 11 is a cross sectional view of the improved blanking operation.

Before machining, the disks A (FIG. 2) are blanked from flat steel plates or sheets which are fed, one at a time, to a blanking press in which are mounted the blanking dies shown in FIGS. 11 and 12. Preferably, a hydraulic stack lifter, magnetic roll sheet gripper and roll feeder, shown in FIG. 10, automatically feed the plates from a stack supported on a hydraulic lift.

Referring to FIG. 10, the plate feeding apparatus comprises a base frame indicated generally at 11 and having upright stanchions 12 and horizontal cross support members 13. A supporting table 14 is vertically slidable between the stanchions 12 and is raised by hydraulic lift cylinders 15 actuating piston rods 16 to raise the table and a stack of plate S supported thereon.

A horizontal series of rolls, preferably in groups of three, is supported in the cross members 13 and arranged to be contacted by the top plate in the stack when the stack is lifted. In each group of three rolls the middle roll 17 is a drive roll and the two end rolls 18 are magnetic rolls. The drive rolls are interconnected by a drive chain which is driven from a pulley 19 driven by a motor 20, and the magnetic rolls 18 are adapted to be energized by electric current in a well-known manner. A pressure switch roll 21, which extends slightly below the level of the rolls 17 and 18 is adapted, when contacted by the top plate in the stack S, to energize the magnetic rolls 18 and start the motor to drive the intermediate rolls 17, at the same time shutting off pressure fluid to the cylinders 15 to allow the table 14 to descend. The magnetic force of the rolls 18 is regulated so that only the top sheet S' will be held by the magnetic rolls as the stack S descends. A limit switch 22 on table 14 is actuated when the bottom plate of the stack is removed, and the switch 22 is in circuit with the control for the hydraulic lifts 15, so that the table can not be raised until a new stack of plates S is loaded thereon.

The drive rolls 17 move the top sheet S' to the left as viewed in FIG. 10 and it is engaged by the pinch rolls 23 and conveyed onto the conveyor rolls 24 which may also be driven by suitable chain drives from the motor 20. At the outer end of the table is another pair of pinch rolls indicated at 25 which feeds the sheet into the blanking press. This automatic plate feeder may be controlled by the same man who operates the blanking press.

The Blanking Operation

Figure 11A:
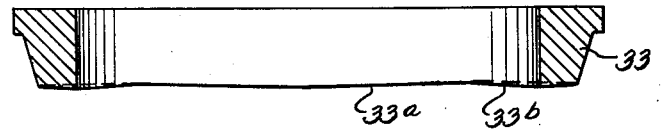
FIG. 11a is a detached cross sectional view of the upper female die ring.

Referring to FIGS. 11 and 11a, the blanking dies are mounted in a conventional press and comprise an upper punch holder 26 connected to the press ram 27, and a lower die shoe 28 supported on the bed or table of the press. The die shoe has a central bore 29 through which the central slug punched out of the blank is discharged, and an annular hub hole die 30 and backing plate 31 are supported on top of the die shoe around the central hole 29. An annular male die ring 32 is carried on the upper surface of the die shoe 28 and is adapted to telescope within a female die ring 33 carried on the bottom of the upper die holder 26. Retainer clamp blocks 34 are secured by screws 35 to the die shoe 28 and clamps the male die ring 32 and the hub hole die 30 to the die shoe. The female die ring 33 is similarly clamped to the die holder 26, and preferably a spacer ring 36 is secured to the die holder around the base of the ring 33 to allow for replacing the ring 33 with larger die rings.

The center punch 37 is secured to the die holder 26 by retainer clamp ring 38 and a stripper plate 39 surrounds the center punch 37 within the female die ring 33. The stripper plate is carried by guide rods 40 which are attached at their upper ends to a bridge plate 41 movable in a recess 42 in the die holder and urged upwardly by compression springs 43. A removable knockout bar 44 on the press ram is adapted to engage the bridge plate 41.

In the blanking operation, a plate S' is fed across the male die ring 32 with the ram in raised position. As the press is operated to lower the ram the male die ring telescopes within the female ring 33 to shear a circular blank and simultaneously punch a circular hub hole at the center of the blank. Referring to FIG. 11a, the female die ring 33 has a series of inclined portions 33a, 33b in its lower edge to provide a shearing action as it telescopes over the male die. Similarly, the bottom portion of the center punch 37 is provided with inclined portions as shown in FIG. 11 to obtain a shearing action as the punch passes through the center of the blank.

As the circular blank A is sheared from the plate S', the stripper plate 39 retracts to allow the blank A to pass into the female die 33 where it is held by friction as the ram and die holder 26 are raised. The knockout bar 44 is then operated to push the stripper plate 39 down and strip the blank A from the female die. As the blank is sheared, the scrap metal at one side of the male die is held against a pressure block 45 by lifting arms 46 supported on guide rods 47 extending through the die shoe. The scrap metal on the other side of the die ring is deflected away from the die shoe by a recess 48.

Referring to FIGS. 12 and 12a, the blanking press is indicated generally at P, and has the knockout bar 44 extending transversely through the ram 27 for stripping the blank A from the female die as the ram ascends. A sliding carriage 12–1 is mounted on a frame 12–2 on the discharge side of the press for movement to and from the position under the ram shown in full lines.

A fluid cylinder 12–3 is mounted atop the frame 12–2, and has a piston rod 12–4 attached to a flange on the carriage. The inner end of the carriage has an inclined portion 12–5 which is adapted to move under the ram and receive the blank therefrom, and a transverse stop bar 12–6 at the base of the inclined portion normally retains the blank thereon. The ends of the stop bar are movable upwardly in slotted brackets 12–7, and are engaged by cam blocks 12–8 on the frame as the carriage moves away from the press, to release the blank and allow it to drop from the inclined portion 12–5 onto a slatted conveyor 12–9 driven by a motor 12–10 on the lower part of frame 12–2.

Assuming the carriage 12–1 is in the full line position of FIGS. 12 and 12a, and a plate S' is in the phantom position against a retractible stop 12–11, as the ram 27 descends a micro switch $M_1$ is actuated by a cam on the ram and energizes a solenoid valve (not shown) to operate the piston rod 12–4 and move the carriage to the left out of the way of the ram. On completion of the downstroke the circular blank A is punched out and held in the upper female die as the ram is raised, as previously described.

As the carriage moves to the left the blank A thereon from the previous punching operation is released when the transverse stop bar is raised by contact with the cam blocks 12–8, and drops onto the slatted conveyor 12–9.

As the ram starts to rise it actuates micro switch $M_1$ and energizes a solenoid valve (not shown) to reverse the piston rod 12–4 and return the carriage to its position under the ram. Further rise of the ram causes the knockout bar to drop the blank on the inclined portion 12–5 of the carriage which actuates a micro switch $M_2$ on the carriage in circuit with micro switch $M_1$, causing the carriage to move to the left with the blank thereon. Should there be no blank on the carriage, actuation of micro switch $M_2$ by the descending ram will nevertheless cause the carriage to move to the left out of the way of the press.

A micro switch $M_3$ connected with the press operating circuit is mounted on the frame 12–2, and is adapted to be closed by the carriage when it reaches its extreme left position. Accordingly, the ram cannot be operated to descend unless the carriage is at its extreme left position.

The conveyor 12–9 discharges the blanks successively onto a roller discharge chute 12–12, which in turn guides the blanks onto a table 12–13 where they strike against a vertical stop 12–14 and form a stack of blanks. Side gates 12–15 form guide walls on opposite sides of the stack, and the gates are vertically slidable in vertical guide bars 12–16. Fluid motors 12–17 are adapted to operate lift chains 12–18 attached to said gates 12–15 and allow a stack of blanks to be conveyed laterally in either direction by a drag chain 12–19 on conveyor rollers which deliver the stack to the spinning operation.

The fluid motors 12–17 may be operated to raise the gates 12–15 by a micro switch $M_4$ which is actuated by the stack of blanks when it reaches a predetermined height. The gates 12–15 are preferably adjustable relative to each other for various sizes of blanks by means of adjusting screws 12–20 on the frame 12–21.

What is claimed is:
1. Apparatus for continuously punching circular blanks for disk wheels progressively from a succession of plates and stacking said blanks, including a press, an upper female blanking die and a lower male blanking die mounted in said press, means for frictionally retaining a blank in said female die as the die is raised, knockout means for dropping said blank from said female die when said die reaches a predetermined height, a sliding carriage on the discharge side of the press, means for moving said carriage to and from a position below said female die to recieve a blank therefrom, a discharge conveyor below said carriage to receive a blank from said carriage, a discharge chute at the end of said conveyor, a table to receive blanks from said chute, guide gates on opposite sides of said table to cause stacking of successive blanks thereon, and means to raise at least one of said gates to allow discharge of a stack of blanks.

2. Apparatus for continuously punching circular blanks for disk wheels progressively from plates, including a press, a vertically movable upper female blanking die and a lower male blanking die mounted in said press, means for retaining a blank in said female die as the die is raised, means for dropping said blank from said female die when said die reaches a predetermined height, a frame on the discharge side of the press, a sliding carriage on said frame and having an inclined end portion, means responsive to the upward movement of said female die to move said carriage to a position in which said inclined portion is under said female die to receive a blank therefrom, means responsive to downward movement of said female die to move said carriage away from said position, retractible stop means on said inclined portion to retain said blank thereon, cam block means on said frame for actuating said stop means on movement of said carriage away from said position to release said blank, and a discharge conveyor below said carriage to receive the released blank.

3. Apparatus according to claim 1, including means for magnetically separating and automatically progressively feeding plates successively into the press from a stack of plates.

4. Apparatus according to claim 2, including a stacking table for receiving blanks successively from said discharge conveyor, guide gates on opposite sides of said table to cause stacking of successive blanks thereon, control means on one of said side gates actuated when a stack on the table reaches a predetermined height, and piston means actuated by said control means to raise at least one of said gates.

5. Apparatus according to claim 2, including switch means on said frame electrically connected to said press and actuated by movement of the carriage away from said press whereby downward movement of said female die is prevented until the carriage moves away from the press.

6. Apparatus for continuously punching circular blanks for disk wheels progressively from plates, including a press, a vertically movable upper female blanking die (33) and a lower male blanking die (32) mounted in said press, means (39) for retaining a blank (A) in said female die (33) as the die is raised, means (44) for dropping said blank (A) from said female die (33) when said die reaches a predetermined height, a sliding carriage (12–1) on the discharge side of the press, means (M1, 12–3) responsive to the upward movement of the female die (33) to move said carriage (12–1) under said female die (33) to receive a blank (A) therefrom, means (M2, 12–3) responsive to the downward movement of said female die (33) to move said carriage (12–1) away from said female die (33), means (12–6) actuated by said latter movement of said carriage (12–1) to discharge a blank (A) therefrom, and a discharge conveyor (12–9) below said carriage (12–1) to receive a blank (A) from said carriage (12–1), a stacking table (12–13) for receiving blanks (A) successively from said discharge conveyor (12–9), guide gates (12–15) on opposite sides of said table (12–13) to cause stacking of successive blanks thereon, and means (12–17) to raise at least one of said gates (12–15) when a stack on the table reaches a predetermined height.

7. Apparatus according to claim 6, including switch means (M3) on said discharge conveyor (12–9) electrically connected to said press and actuated by movement of the carriage (12–1) away from said press whereby downward movement of said female die (33) is prevented until the carriage (12–1) moves away from the press.

References Cited in the file of this patent
UNITED STATES PATENTS

| | | |
|---|---|---|
| 997,107 | Laukhuff | July 18, 1911 |
| 1,496,726 | Myhrum | June 3, 1924 |
| 2,224,279 | Underwood | Dec. 10, 1940 |
| 2,275,525 | Halmrast | Mar. 10, 1942 |
| 2,315,256 | Hoegele et al. | Mar. 30, 1943 |
| 2,562,247 | Van Schie | July 31, 1951 |
| 2,901,126 | Holberstadt | Aug. 25, 1959 |

UNITED STATES PATENT OFFICE

CERTIFICATE OF CORRECTION

Patent No. 3,143,015              August 4, 1964

Karl Luther et al.

It is hereby certified that error appears in the above numbered patent requiring correction and that the said Letters Patent should read as corrected below.

Column 6, line 37, for "997,107" read -- 998,017 --.

Signed and sealed this 15th day of December 1964.

(SEAL)
Attest:

ERNEST W. SWIDER            EDWARD J. BRENNER
Attesting Officer             Commissioner of Patents